United States Patent
Fyke

(10) Patent No.: US 8,503,174 B2
(45) Date of Patent: Aug. 6, 2013

(54) MAGNETIC SLIDER MECHANISM FOR ELECTRONIC DEVICES AND METHODS OF USE

(75) Inventor: Steven Henry Fyke, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 233 days.

(21) Appl. No.: 13/020,955

(22) Filed: Feb. 4, 2011

(65) Prior Publication Data

US 2012/0200990 A1 Aug. 9, 2012

(51) Int. Cl.
*G06F 1/16* (2006.01)
*H04M 1/00* (2006.01)
*E05C 17/56* (2006.01)

(52) U.S. Cl.
USPC ............. 361/679.55; 361/679.56; 455/575.1; 455/575.4; 292/251.5

(58) Field of Classification Search
USPC ............ 361/679.01–679.45, 679.55–679.59; 455/575.1, 575.3, 575.4; 292/251.5; 345/156, 345/157, 168, 169, 905
See application file for complete search history.

(56) References Cited

U.S. PATENT DOCUMENTS

| | | | |
|---|---|---|---|
| 5,857,157 A | 1/1999 | Shindo | |
| 6,836,404 B2 | 12/2004 | Duarte | |
| 7,006,015 B2 | 2/2006 | England | |
| 7,363,066 B2 | 4/2008 | Im et al. | |
| 7,375,952 B2 | 5/2008 | Tsai | |
| 7,508,411 B2 | 3/2009 | Boesen | |
| 7,599,487 B2 | 10/2009 | Lim | |
| 7,831,286 B2 * | 11/2010 | Cho et al. | 455/575.4 |
| 8,098,231 B2 * | 1/2012 | Jacobs et al. | 345/168 |
| 8,223,477 B2 * | 7/2012 | Shi et al. | 361/679.01 |
| 2005/0009581 A1 | 1/2005 | Im et al. | |
| 2006/0252471 A1 | 11/2006 | Pan | |
| 2007/0091582 A1 | 4/2007 | Ku et al. | |
| 2007/0142101 A1 * | 6/2007 | Seshagiri et al. | 455/575.4 |
| 2007/0153465 A1 * | 7/2007 | Shih et al. | 361/683 |
| 2008/0032637 A1 | 2/2008 | Ladouceur et al. | |
| 2008/0058034 A1 | 3/2008 | Lu et al. | |
| 2008/0081505 A1 | 4/2008 | Ou et al. | |
| 2008/0117573 A1 | 5/2008 | Im et al. | |

(Continued)

OTHER PUBLICATIONS

Extended European Search Report, dated Jun. 30, 2011, for corresponding European Application No. 11153376.6 (6 pages).

(Continued)

*Primary Examiner* — Jayprakash N Gandhi
*Assistant Examiner* — Nidhi Desai
(74) *Attorney, Agent, or Firm* — Finnegan, Henderson, Farabow, Garrett & Dunner, LLP

(57) ABSTRACT

A portable processing device that includes a base portion and a main portion. The base portion includes a magnet and guides. The main portion includes a magnetic area. The base portion and the main portion are separable and configured to be held together by a magnetic force between the magnetic area and the magnet. The main portion is configured to be slideably movable with respect to the base portion in a sliding direction defined by the guides. The base portion may further include a cavity adjacent to the top end of the base portion, with a second magnet disposed proximate the cavity. At the end of a sliding motion, the bottom of the main portion is pulled into the cavity by magnetic attraction between the second magnet and the magnetic area. In some embodiments, the main portion may be capable of a flip with respect to the base portion.

16 Claims, 13 Drawing Sheets

U.S. PATENT DOCUMENTS

| | | | |
|---|---|---|---|
| 2008/0139261 A1* | 6/2008 | Cho et al. | 455/575.4 |
| 2008/0174942 A1 | 7/2008 | Yang et al. | |
| 2009/0009949 A1 | 1/2009 | Lai et al. | |
| 2009/0015996 A1 | 1/2009 | Chang et al. | |
| 2009/0061956 A1 | 3/2009 | Matsuoka | |
| 2009/0168339 A1 | 7/2009 | Lee | |
| 2009/0239594 A1* | 9/2009 | Huang et al. | 455/575.1 |
| 2010/0035669 A1 | 2/2010 | Jang et al. | |
| 2010/0103054 A1 | 4/2010 | Shi et al. | |
| 2010/0120479 A1 | 5/2010 | Ogatsu | |
| 2010/0124955 A1 | 5/2010 | Lin | |
| 2010/0184492 A1 | 7/2010 | Kim et al. | |
| 2010/0304793 A1* | 12/2010 | Kim et al. | 455/566 |
| 2011/0159934 A1* | 6/2011 | Yu et al. | 455/575.4 |
| 2011/0216485 A1* | 9/2011 | Kang et al. | 361/679.01 |

OTHER PUBLICATIONS

Motorola RIZR Z8, http://www.mobilestopic.com/reviews/motorola/rizr-z8.html, MobilesTopic, May 19, 2008 (5 pages).

* cited by examiner

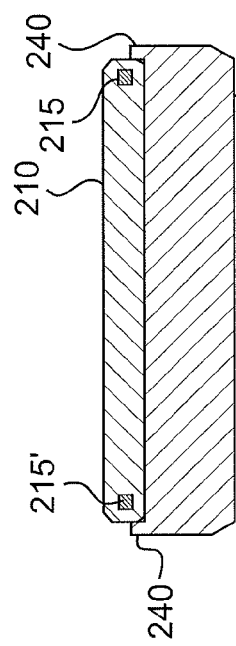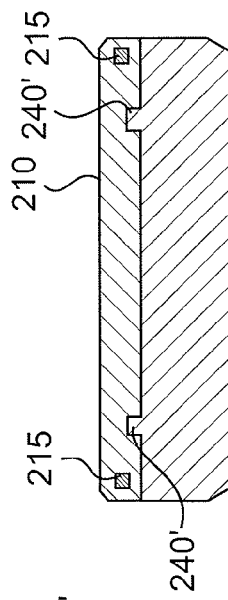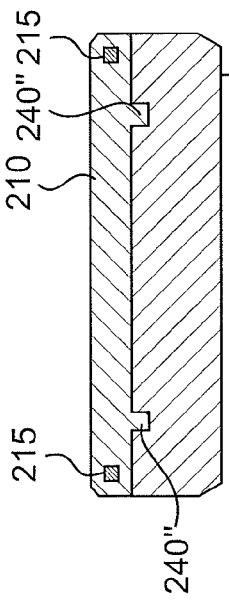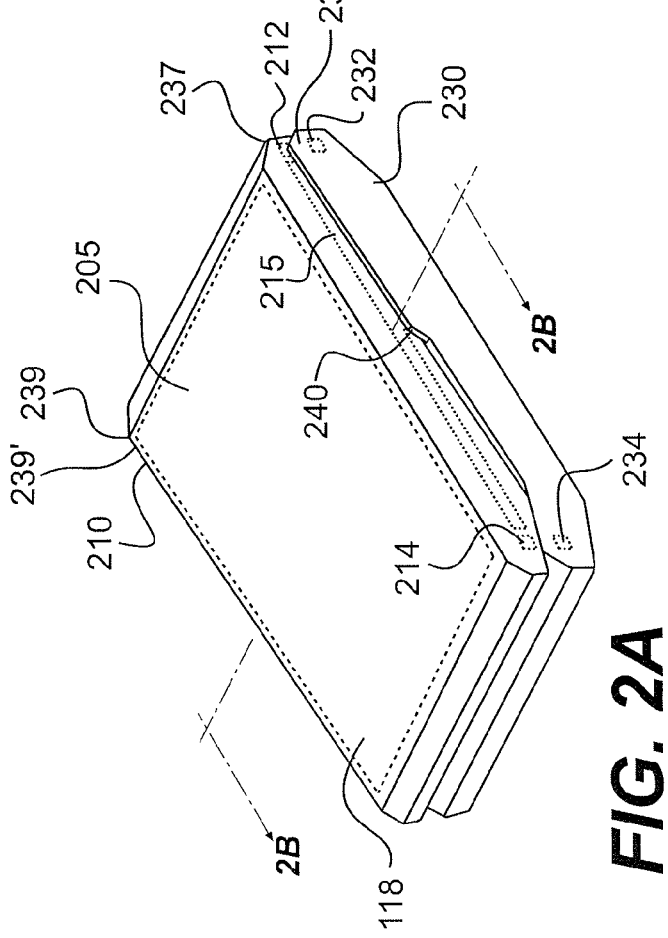

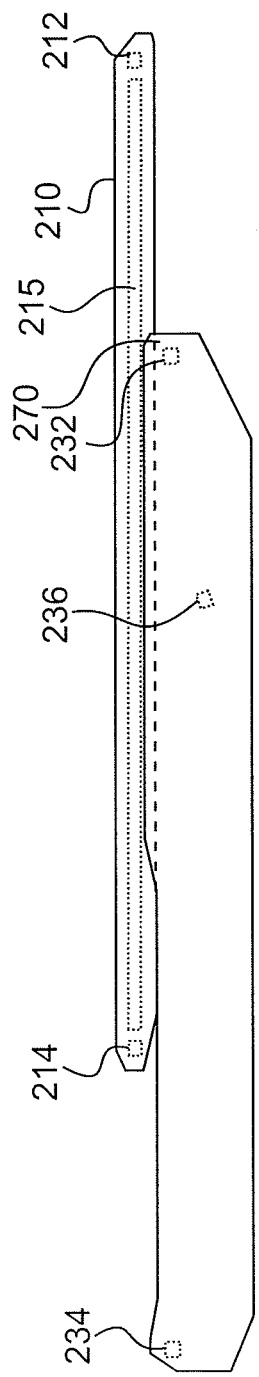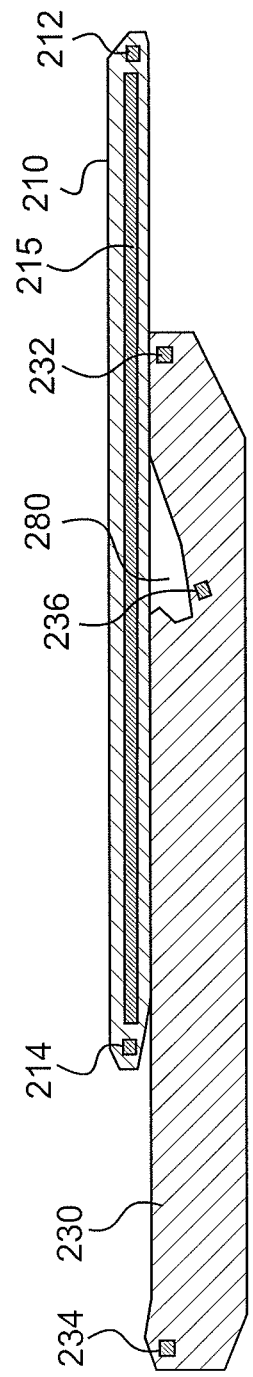

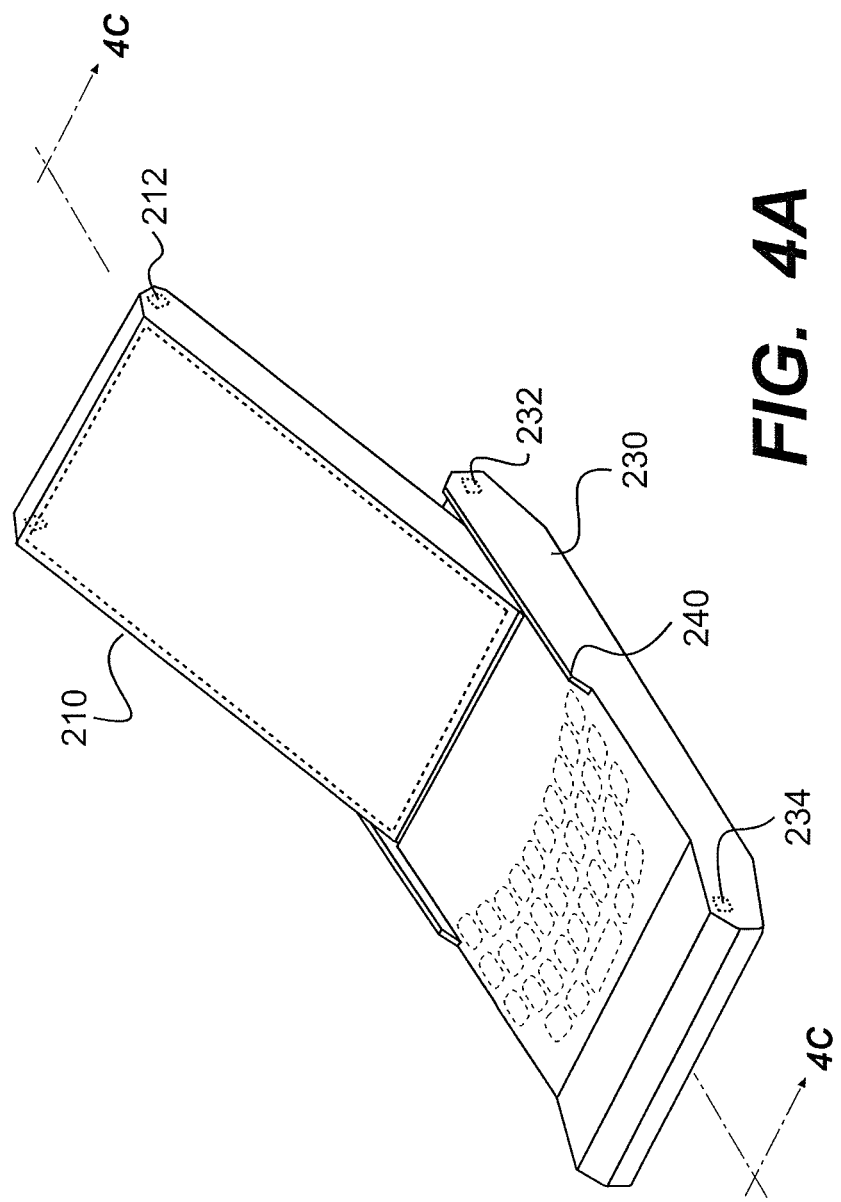

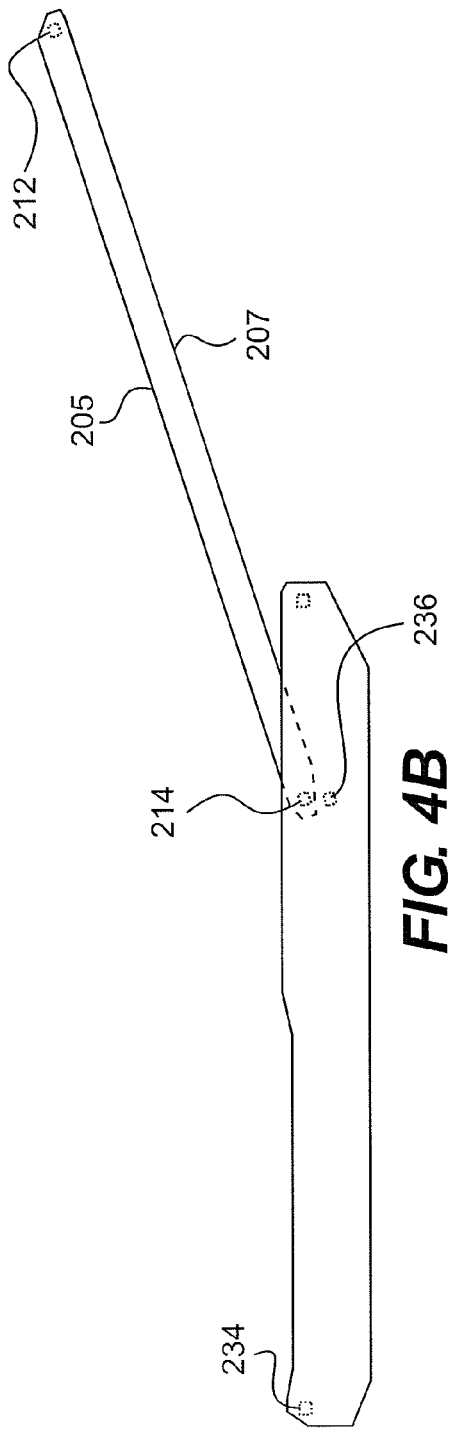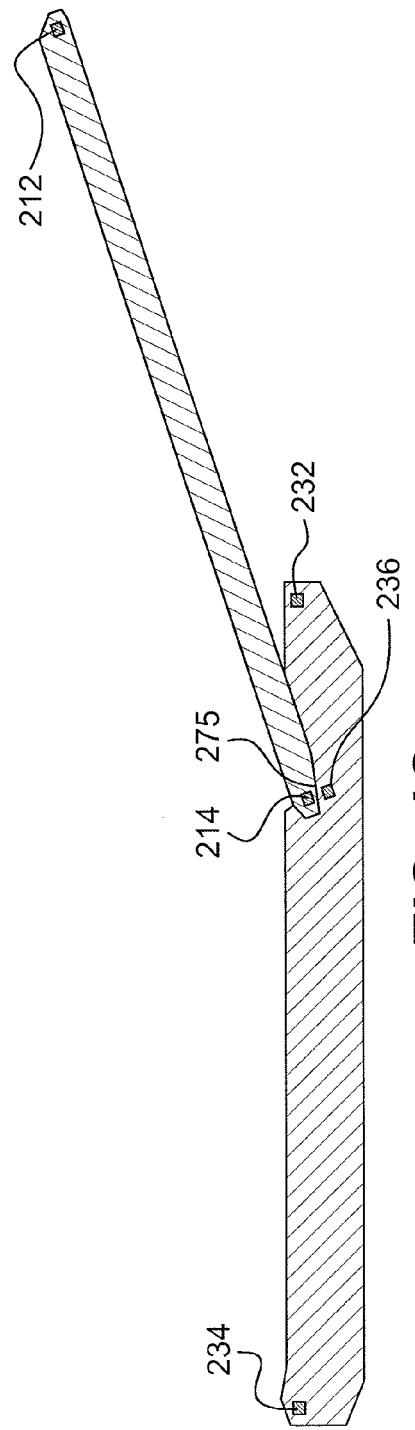

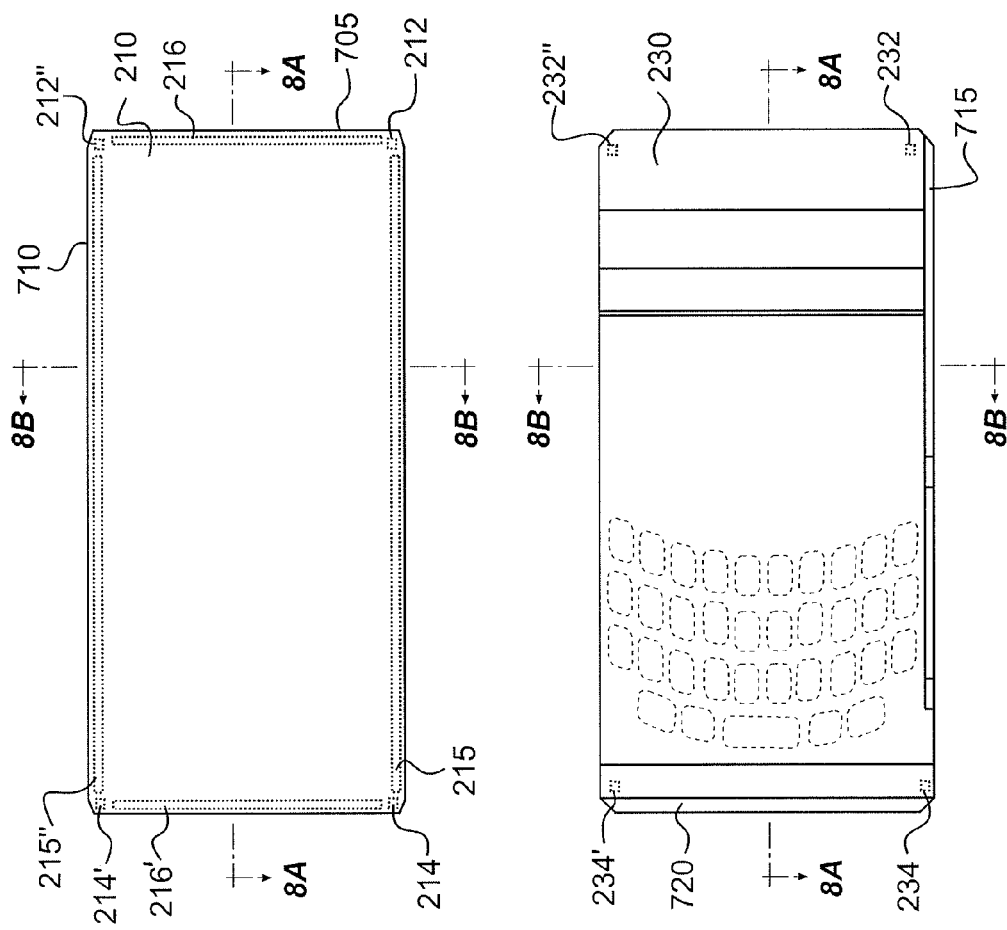

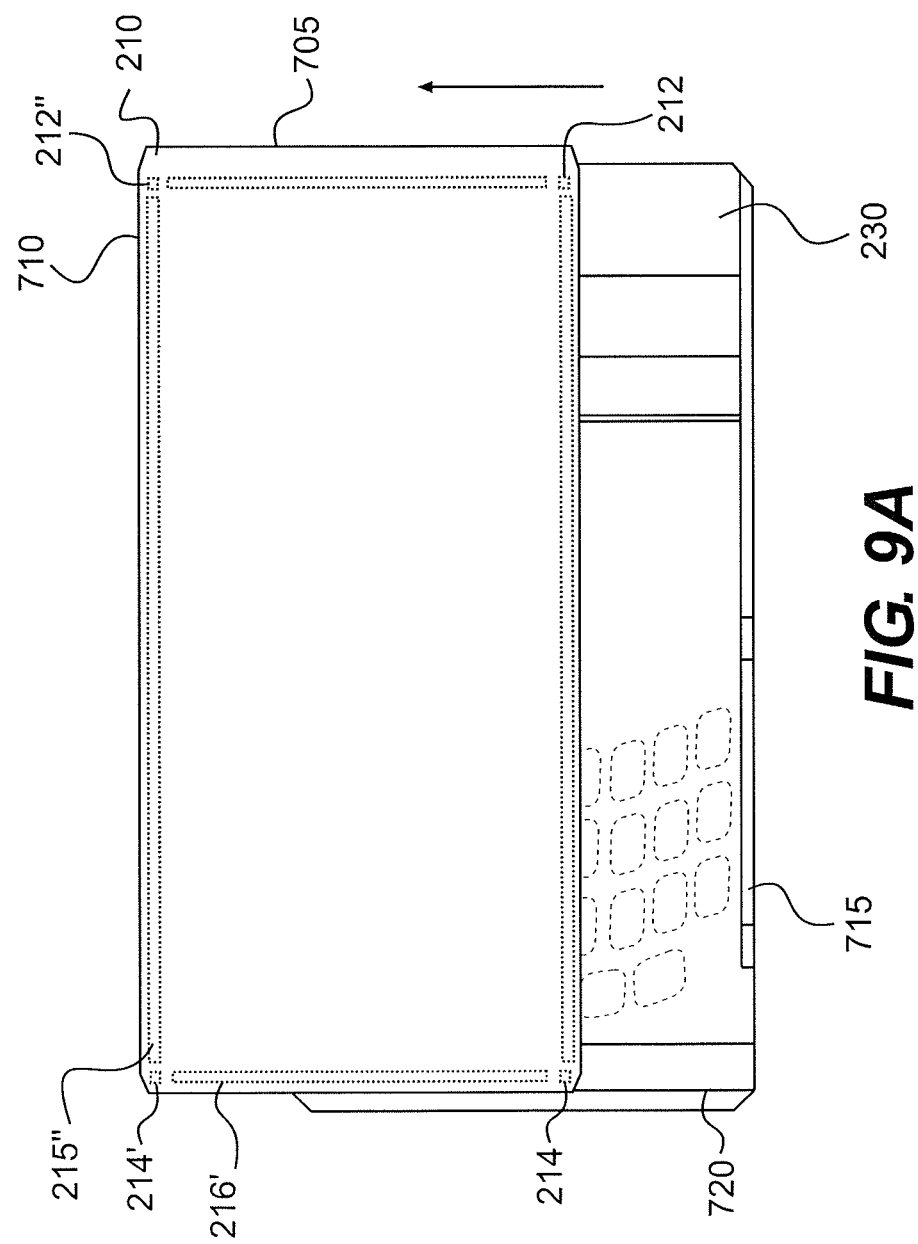

MAGNETIC SLIDER MECHANISM FOR ELECTRONIC DEVICES AND METHODS OF USE

FIELD

This disclosure relates generally to portable electronic devices and, more particularly, to a portable electronic device including a base portion and a main portion, the base and the main portion being separable from one another and held together through magnetic force.

BACKGROUND INFORMATION

Electronic devices, including portable electronic devices, have gained widespread use and often provide a variety of functions. Portable electronic devices include, for example, personal data assistants (PDAs), handheld computers, tablet computers, two-way pagers, cellular telephones, cellular smart-phones, wireless organizers, digital cameras, wirelessly enabled notebook computers, and the like. Although some portable electronic devices are stand-alone devices, many feature wireless communication capability for communication with other devices. Some other portable electronic devices, such as a handheld electronic game device, digital photograph album, digital camera, or other portable devices, lack wireless communication capability.

Many portable electronic devices are used for written communication, such as composing e-mail or text messages. The decrease in the size of the portable electronic devices and their display areas makes access to a full keyboard and maximum display area difficult. To increase the display area while keeping a larger area for keys on a keyboard, portable electronic devices have been developed where a top portion slides relative to a bottom portion. The top portion generally includes a display and the bottom portion generally includes keys and other input members.

Such devices often require mechanisms to assist the sliding and to connect the top portion to the bottom portion. For example, such devices may include a groove in the bottom portion with a narrow opening, into which a peg or other knobbed projection from the top portion fits. The knobbed portion of the peg is too large to fit through the narrow opening of the groove, keeping the top portion and the bottom portion together.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 2A is a topside perspective view of a closed portable electronic device, consistent with disclosed embodiments;

FIGS. 2B-2D are section views taken along plane 2B-2B of FIG. 2A showing guide rails of a portable electronic device, consistent with disclosed embodiments;

FIG. 3B is a side outside view of a partially open portable electronic device, consistent with disclosed embodiments;

FIG. 3C is a side section view taken along plane 3C-3C of FIG. 3A showing a partially open portable electronic device, consistent with disclosed embodiments;

FIG. 4A is a topside perspective view of a fully open portable electronic device, consistent with disclosed embodiments;

FIG. 4B is a side view of a fully open portable electronic device, consistent with disclosed embodiments;

FIG. 4C is a section view taken along plane 4C-4C of FIG. 4A showing a fully open portable electronic device, consistent with disclosed embodiments;

FIG. 7A is a top view of the main portion of a portable electronic device capable of sliding in two directions, consistent with disclosed embodiments;

FIG. 7B is a top view of the base portion of a portable electronic device capable of sliding in two directions, consistent with disclosed embodiments;

FIG. 9A is a topside view of a portable electronic device in a partially open position in a second direction, consistent with disclosed embodiments.

DETAILED DESCRIPTION

Figure 1:
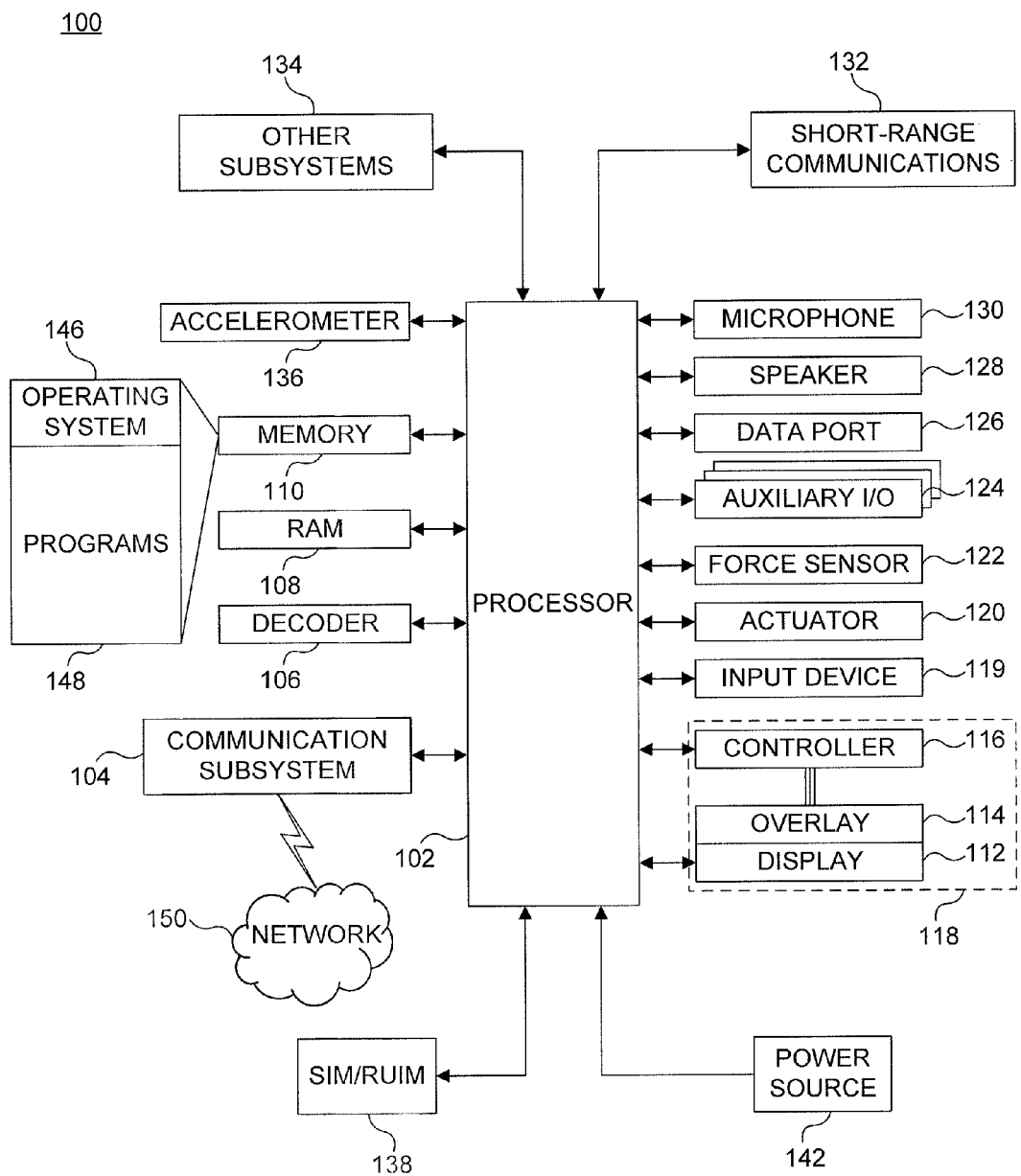
FIG. 1 is an exemplary block diagram of a portable electronic device, consistent with disclosed embodiments.

Disclosed embodiments provide, in an electronic device, a magnetic slider mechanism for allowing a base portion to slide relative to a main portion. The base and main portion are held together through magnetic force and separable when such force is overcome. Disclosed embodiments may include guide rails or grooves and ridges to provide a sliding direction. In certain embodiments, the main portion may slide in two defined sliding directions with respect to the base portion. In certain embodiments, the base portion may include a cavity into which the main portion drops at the end of a sliding motion, causing the main portion to sit at an angle with respect to the base portion. The main portion may operate as a portable electronic device when separated from the base portion. In certain embodiments, the base portion and the main portion may communicate using short wave wireless communication.

Reference will now be made in detail to exemplary embodiments, examples of which are illustrated in the accompanying drawings. For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to a portable electronic device. Examples of portable electronic devices include mobile, or handheld, wireless communication devices such as pagers, cellular phones, cellular smart-phones, wireless organizers, personal digital assistants, wirelessly enabled notebook computers, netbooks, tablets, and so forth. The portable electronic device may also be a portable electronic device without wireless communication capabilities, such as a handheld electronic game device, digital photograph album, digital camera, or other portable device.

A block diagram of an exemplary portable electronic device 100 is shown in FIG. 1. In disclosed embodiments, portable electronic device 100 may include a main portion and a base portion. The elements of FIG. 1 may be included in the main portion, the base portion, or a combination. Thus, some of the components of FIG. 1 may be duplicated in the main portion and in the base portion. The main portion and the base portion may be separable, and the main portion may operate as an electronic device when separated from the base portion.

Portable electronic device 100 includes multiple components, such as processor 102 that controls the overall operation of the portable electronic device 100. Processor 102 may be, for instance, and without limitation, a microprocessor (μP). Communication functions, including data and voice communications, are performed through communication subsystem 104. Data received by the portable electronic device 100 may be decompressed and decrypted by a decoder 106. Communication subsystem 104 may receive messages from and send messages to a wireless network 150. Wireless network 150 may be any type of wireless network, including, but not limited to, data wireless networks, voice wireless networks, and networks that support both voice and data communications. Power source 142, such as one or more rechargeable batteries or a port to an external power supply, power portable electronic device 100.

Processor 102 may interact with other components, such as Random Access Memory (RAM) 108, memory 110, and display 112. Display 112 may have a touch-sensitive overlay 114 operably connected to an electronic controller 116 that together comprise touch-sensitive display 118. Processor 102 may interact with touch-sensitive overlay 114 via electronic controller 116. User-interaction with a graphical user interface may be performed through the touch-sensitive overlay 114. Information, such as text, characters, symbols, images, icons, and other items that may be displayed or rendered on portable electronic device 100, may be displayed on the touch-sensitive display 118 via the processor 102. Although described as a touch-sensitive display with regard to FIG. 1, display 118 is not limited to a touch-sensitive display and can include any display screen for portable devices.

Processor 102 may also interact with one or more actuators 120, one or more force sensors 122, auxiliary input/output (I/O) subsystem 124, data port 126, speaker 128, microphone 130, short-range communications 132, and other device subsystems 134. Processor 102 may interact with accelerometer 136, which may be utilized to detect direction of gravitational forces or gravity-induced reaction forces.

To identify a subscriber for network access, portable electronic device 100 may use a Subscriber Identity Module or a Removable User Identity Module (SIM/RUIM) card 138 for communication with a network, such as wireless network 150. Alternatively, user identification information may be programmed into memory 110.

Portable electronic device 100 may include operating system 146 and software programs or components 148 that are executed by processor 102 and may be stored in a persistent, updatable store such as memory 110. Additional applications or programs may be loaded onto portable electronic device 100 through wireless network 150, auxiliary I/O subsystem 124, data port 126, short-range communications subsystem 132, or any other suitable subsystem 134. Short-range communications subsystem 132 may also allow the main portion of device 100 to communicate with the base portion, including when the main and base portions are separated.

A received signal such as a text message, an e-mail message, or web page download may be processed by communication subsystem 104 and input to processor 102. Processor 102 may process the received signal for output to display 118 and/or to auxiliary I/O subsystem 124. A subscriber may generate data items, for example e-mail or text messages, which are transmitted over wireless network 150 through communication subsystem 104. For voice communications, the overall operation of the portable electronic device 100 is similar. Speaker 128 may output audible information converted from electrical signals, and microphone 130 may convert audible information into electrical signals for processing. Speaker 128, display 118, and data port 126 may be considered output apparatuses of device 100.

Touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes capacitive touch-sensitive overlay 114. Overlay 114 is an assembly of multiple layers in a stack including, for example, a substrate, a ground shield layer, a barrier layer, one or more capacitive touch sensor layers separated by a substrate or other barrier, and a cover. The capacitive touch sensor layers are any suitable material, such as patterned indium tin oxide (ITO).

One or more touches, also known as touch contacts, touch events, or actuations, may be detected by touch-sensitive display 118. Processor 102 or controller 116 may determine attributes of the touch, including a location of a touch. Touch location data includes an area of contact or a single point of contact, such as a point at or near a center of the area of contact. The location of a detected touch may include x and y components, e.g., horizontal and vertical components, respectively, with respect to one's view of touch-sensitive display 118. For example, the x location component may be determined by a signal generated from one touch sensor, and the y location component may be determined by a signal generated from another touch sensor. A signal may be provided to controller 116 or processor 102 in response to detection of a touch. A touch may be detected from any suitable object, such as a finger, thumb, appendage, or other items, for example, a stylus, pen, or other pointer, depending on the nature of touch-sensitive display 118. Multiple simultaneous touches or gestures are also detected. These multiple simultaneous touches may be considered chording events.

Portable device 100 may include input device 119. An input device may include an optical trackpad, a mouse, a trackball, or a scroll wheel, for example. In some embodiments, input device 119 may include an area of touch-screen 118. Input device 119 may assist a user in selection and scrolling inputs.

One or more optional actuators 120 may be depressed by applying sufficient force to a touch-sensitive display 118 to overcome the actuation force of the actuator 120. Actuator 120 may provide input to the processor 102 when actuated. Actuation of the actuator 120 may result in provision of tactile feedback.

In certain embodiments, a mechanical dome switch may be utilized as one or more of actuators 120. In this example, tactile feedback is provided when the dome collapses due to imparted force and when the dome returns to the rest position after release of the switch.

Alternatively, actuator 120 may comprise one or more piezoelectric (piezo) devices that provide tactile feedback for the touch-sensitive display 118. Contraction of the piezo actuators applies a spring-like force, for example, opposing a force externally applied to the touch-sensitive display 118. Each piezo actuator includes a piezoelectric device, such as a piezoelectric (PZT) ceramic disk adhered to a metal substrate. The metal substrate bends when the PZT disk contracts due to build up of charge at the PZT disk or in response to a force, such as an external force applied to touch-sensitive display 118. The charge may be adjusted by varying the applied voltage or current, thereby controlling the force applied by the piezo disks. The charge on the piezo actuator is removed by a controlled discharge current that causes the PZT disk to expand, releasing the force thereby decreasing the force applied by the piezo disks. The charge may advantageously be removed over a relatively short period of time to provide tactile feedback to the user. Absent an external force and absent a charge on the piezo disk, the piezo disk may be slightly bent due to a mechanical preload. Actuator 120, display 118, input device 119, force sensor 122, microphone 130, and data port 126 are considered input apparatuses for device 100.

FIGS. 2A-2D are exemplary views of device 100 in a closed position. Electronic device 100 may include a main or top portion 210 and a base portion 230. Main portion 210 may include an area of magnetically attractive material 215. A magnetic area, such as magnetic area 215, may be composed of any material attracted to a magnet including an inherently magnetized material or non-magnetized materials such as ferromagnetic materials or ferrimagnetic materials. Ferromagnetic materials include steel, iron, nickel, and cobalt. Ferrimagnetic materials include magnetite and other oxides of metals such as aluminum, cobalt, nickel, manganese and zinc. Magnetic area 215 may be a strip located along the edge of both sides of main portion 210, as shown in FIG. 2A. Magnetic area 215 may have a length that allows it to magnetically couple with magnet 232 or magnet 234 provided in the base portion 230 for the duration of a slide motion of main portion 210 with respect to base portion 230. Magnetic area 215 may have a width that provides sufficient magnetic coupling with magnet 232 or magnet 234 to keep main portion 210 and base portion 230 together during the sliding motion. In other embodiments, magnetic area 215 may be a strip running down the center of main portion 210. In other embodiments, magnetic area 215 may have a width extending between positions 237 and 239. The strip may be visible on the exterior, incorporated into, or encased within the housing of main portion 210.

Main portion 210 may also include two additional areas of magnetically attractive material on each side, such as magnetic areas 212 and 214. Areas 212 and 214 may be located at each end of magnetic area 215. Areas 212 and 214 may be comprised of magnetic material that produces a stronger magnetic coupling with magnets 232 and 234 than the magnetic coupling between magnetic area 215 and magnet 232. Areas 212 and 214 may be separate from magnetic area 215, may be attached to area 215, or may be incorporated into area 215. In embodiments without areas 212 and 214, area 215 may extend to the location of areas 212 and 214, so that area 215 couples with magnet 232 and magnet 234 when device 100 is in a closed position. Areas 212 and 214 may, like area 215, be visible on the exterior, incorporated into, or encased within the housing of main portion 210. Main portion 210 may also include planer planar surface 205, which may include display 118.

Base portion 230 may include on both sides magnet 232 and magnet 234. Magnets 232 and 234 may be positioned so that a magnetic coupling with magnetic area 215 keeps main portion 210 connected with base portion 230 when main portion 210 slides open. For example, a user may push on main portion 210 at the end that includes area 214 in a direction of area 212, causing top or main portion 210 to slide with respect to base portion 230. The sliding motion causes magnetic area 215 to move over magnet 232 resulting in magnetic coupling between magnetic area 215 and magnet 232, as described below with respect to FIG. 3A.

As shown in FIG. 2A, device 100 in a closed position may allow magnet 232 to magnetically couple with area 212 and magnet 234 to magnetically couple with area 214. Magnets 232 and 234 may have a stronger magnetic coupling with magnetic areas 212 and 214 than with magnetic area 215. Thus, for example, more force is required to move main portion 210 out of the closed position, when magnet 232 is coupled with area 212, than is required to slide main portion 210 with respect to base portion 230, when magnet 232 is coupled with area 215. Magnet 232 may be located at the top end of base portion 230 and magnet 234 may be located at the bottom end. In certain embodiments, magnet 232 may be a solid piece running along the top of base portion 230 from positions 237' to 239'. In other embodiments, two magnets 232 and 232' may be located at the top of base portion 230, one at position 237' and one at position 239'. In yet other embodiments, magnet 232 may be located in the center of the top of base portion 230. Magnet 234 may be similarly located at the bottom of base portion 230.

As shown in FIG. 2B, base portion 230 may also include guides, such as guide rails 240. Guide rails 240 may run partially or fully along the long side of base portion 230. Guide rails 240 may not connect main portion 210 with base portion 230, but may define a sliding direction when main portion 210 slides with respect to base portion 230. As shown in FIG. 2B, guide rails 240 may define a slot in which main portion 210 fits between guide rails 240. In other embodiments, the guides may include grooves and rails with the rails fitting removably within the grooves and sliding within the grooves to define a sliding direction. For example, as shown in FIG. 2C, main portion 210 may include grooves and base portion 230 may include guide rails 240' as ridges in base portion 230. In other embodiments, as shown in FIG. 2D, guide rails 240" may be ridges in main portion 210 and base portion 230 may include grooves into which each ridge fits. The location and configuration of guide rails 240 is not important so long as the configuration defines a sliding direction and does not prevent separation of main portion 210 and base portion 230.

Figure 3A:
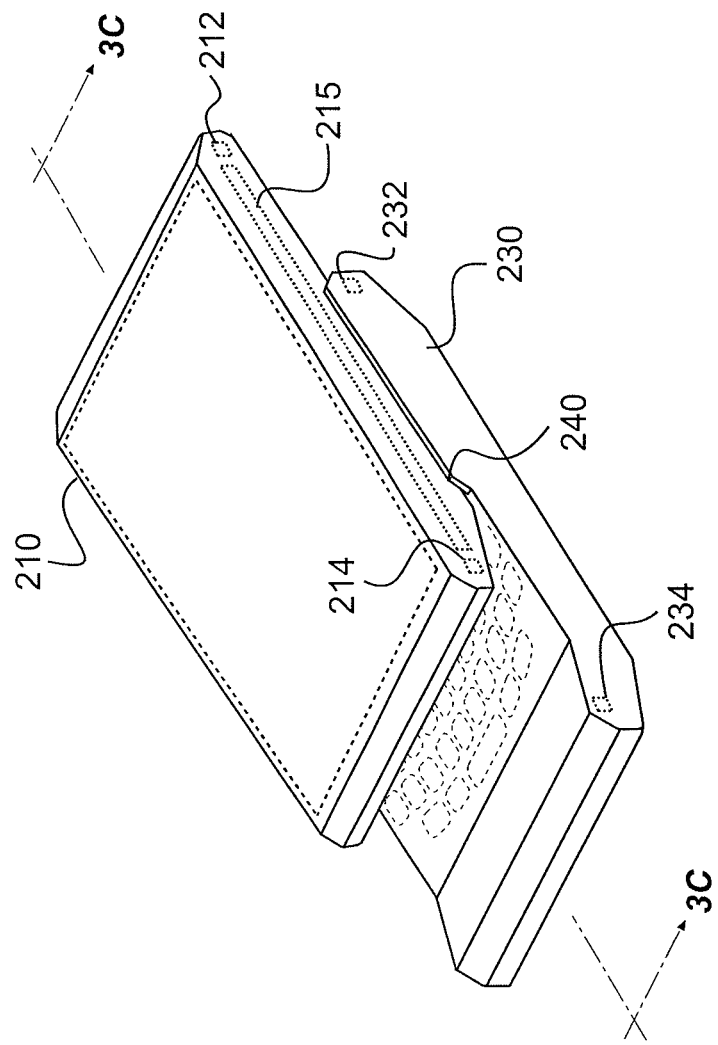
FIG. 3A is a topside perspective view of a partially open portable electronic device, consistent with disclosed embodiments.

FIGS. 3A-3C are exemplary views of device 100 in a partially open position. A user may slide main portion 210 with respect to base portion 230 by overcoming the magnetic coupling of magnet 232 with magnetic area 212 and magnet 234 with magnetic area 214. In embodiments without magnetic areas 212 and 214, the magnetic coupling may be between magnets 232 and 234 and magnetic area 215. Once the magnetic coupling has been overcome, a magnetic coupling occurs between magnet 232 and magnetic area 215, as shown at position 270 in FIG. 3B. This magnetic coupling keeps main portion 210 and base portion 230 together during the sliding motion. While FIGS. 3A-3C show a coupling between magnet 232 and magnetic area 215, it is understood that the main portion 210 may slide in the opposite direction, so that magnetic coupling occurs between magnet 234 and area 215.

FIG. 4A shows a topside view of a fully open portable electronic device, consistent with some disclosed embodiments. In certain embodiments, base portion 230 may define cavity 280, as shown in FIG. 3C. Magnet 236 may be located proximate to cavity 280, as shown in FIGS. 3C and 4C. The user may slide main portion 210 along base portion 230. When the bottom of main portion 210 reaches the cavity, the bottom may be pulled into the cavity 280 by magnetic attraction between magnet 236 and magnetic area 214, creating a magnetic coupling shown at 275 in FIG. 4C. In disclosed embodiments, the magnetic attraction between magnet 236 and magnetic area 214 is greater than the attraction between magnet 232 and magnetic area 215, thus overcoming the coupling between 232 and 215 and causing the bottom of main portion 210 to be pulled into cavity 280. When resting in cavity 280, main portion 210 may sit at a predetermined angle with respect to base portion 230, as shown in FIGS. 4A-4C.

Figure 5A:
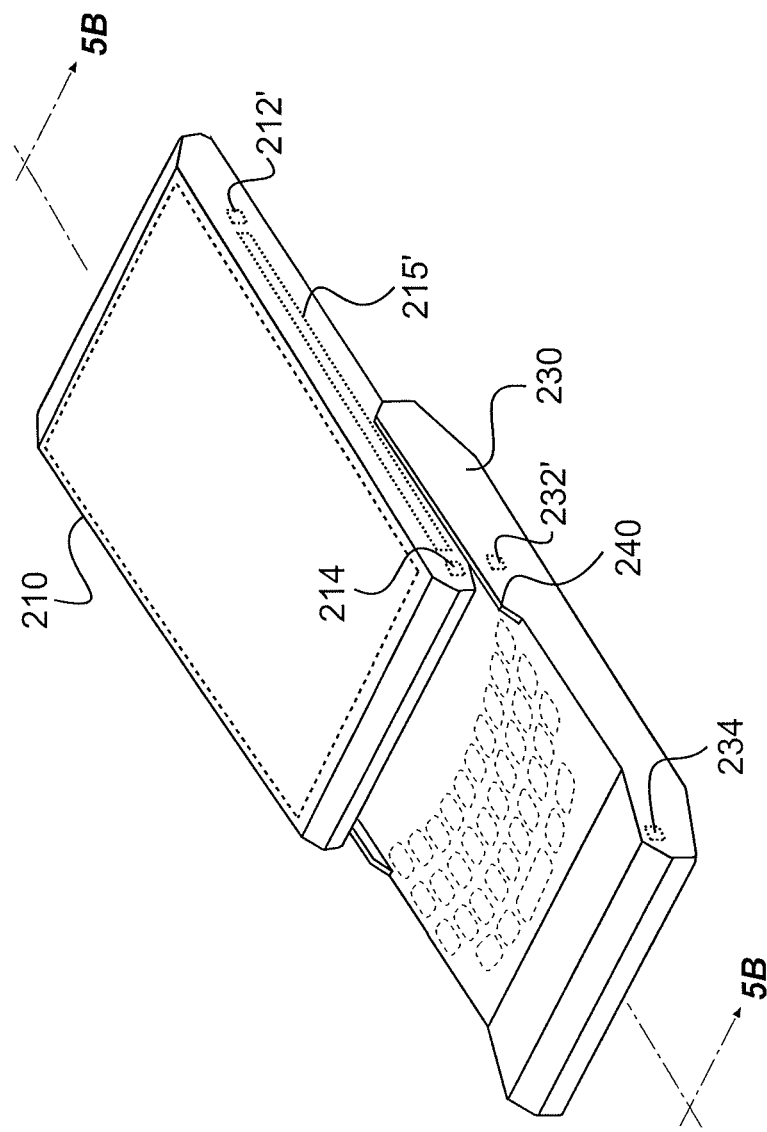
FIG. 5A is a topside perspective view of a fully open portable electronic device, consistent with other disclosed embodiments.
Figure 5B:
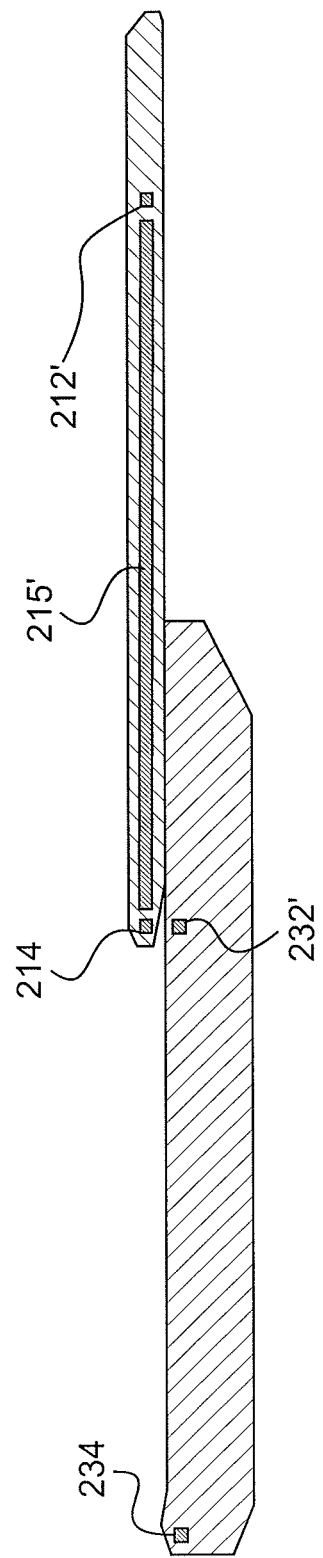
FIG. 5B is a section view taken along plane 5B-5B of FIG. 5A showing the fully open portable electronic device, consistent with disclosed embodiments.

FIG. 5A shows a topside view of a fully open portable electronic device of another disclosed embodiment. The device of FIGS. 5A-5B does not contain cavity 280. Instead, as compared to the embodiment of FIGS. 2A-2B, 3A-3C, and 4A-4C, magnet 232' is located further from the top edge of base portion 230 and magnetic area 212' is located further from the top edge of main portion 210, as shown in FIG. 5A. Magnet 232' and magnetic area 214 may have a stronger magnetic attraction than the attraction between magnet 232' and magnetic area 215'. In other embodiments (not shown), magnet 234 and magnetic area 214 are located further from the bottom edge of the base and main portions and magnet 232' and magnetic area 212' are located at the top edge of the base and main portions. Placement of magnets 232' and 234 and magnetic areas 212' and 214 are not important, so long as the magnetic force between magnet 232' and magnetic area 214 keeps the main portion and the base portion coupled together, as shown in FIG. 5A, until a user slides main portion 210 back to the closed position or physically separates main portion 210 from base portion 230.

Figure 6:
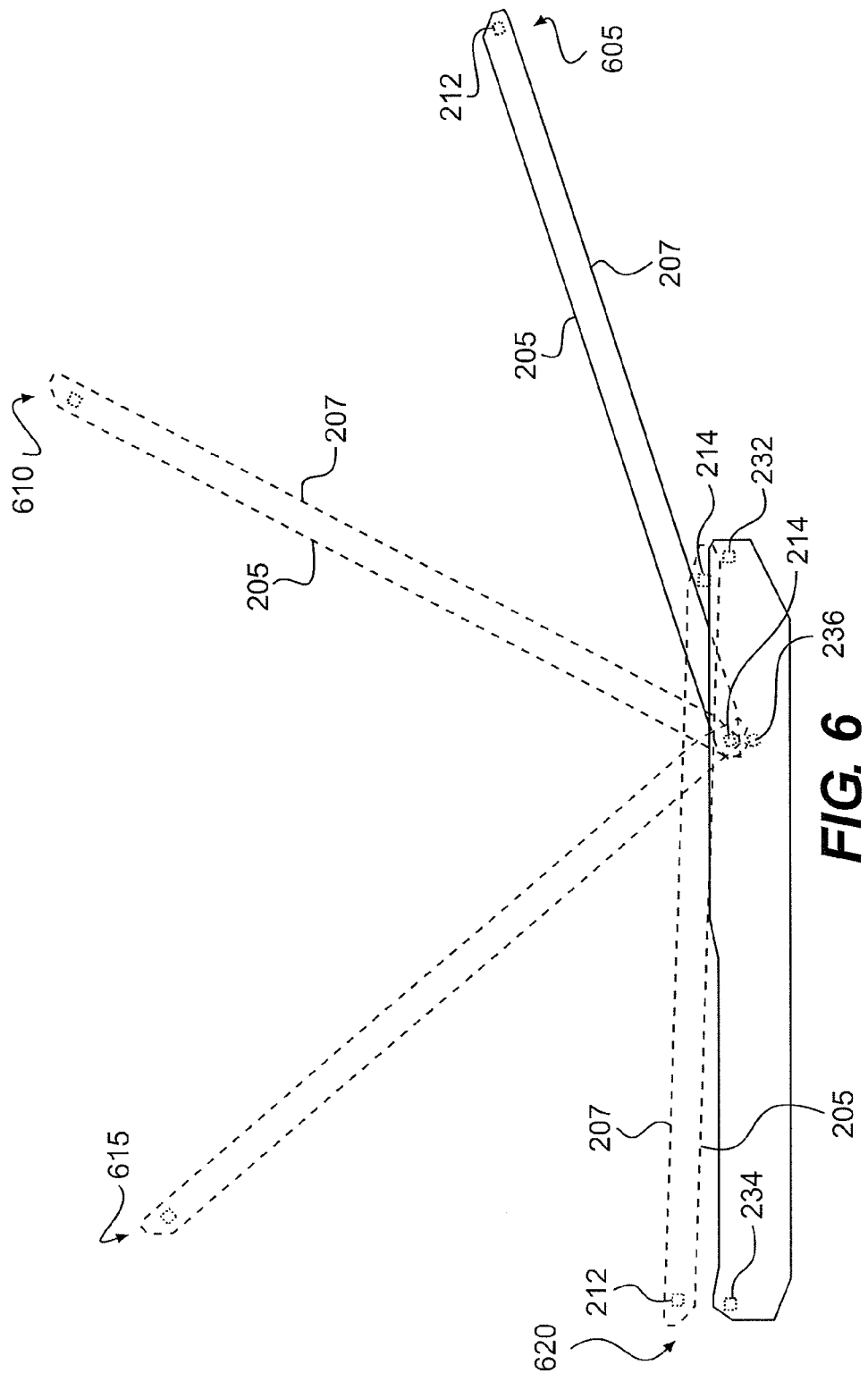
FIG. 6 is a side view of a flip motion of the main portion of the portable electronic device, consistent with disclosed embodiments.

FIG. 6 is a side view of a flip motion of the main portion of the portable electronic device, consistent with disclosed embodiments. With main portion 210 sitting in cavity 280, as shown in FIGS. 4A-4C, a user may apply force to the top edge of main portion 210, for example at the edge with magnetic area 212. By continuing to apply force in this direction, the user may push main portion 210 through positions 605-620, shown with broken lines in FIG. 6, until main portion 210 is once again in a closed position with respect to base portion 230. During the flip motion, the magnetic coupling between magnet 236 and area 214 keeps main portion 210 and base portion 230 together until main portion 210 generally reaches position 615. Generally at position 615, main portion 210 reaches the edge of cavity 280 and the user is required to apply additional force to break the magnetic coupling between magnet 236 and area 214 to continue the flip motion. Generally at position 620, a magnetic attraction between area 212 and magnet 234 and area 214 and magnet 232 causes main portion 210 to slide into alignment with base portion 230 and achieve a closed position.

Through this motion, main portion 210 is flipped, so that planar surface 207, which was generally facing towards base portion 230, is now facing away from base portion 230, and towards the end of the motion, magnetic area 212 aligns with magnet 234 and magnetic area 214 aligns with magnet 232. Guide rails 240 may help keep main portion 210 aligned with base portion 230 during the flipping motion, especially between positions 615 and 620 when the magnetic coupling between magnet 234 and area 212 is established.

In such an embodiment, each planar surface of main portion 210 may contain different input and output apparatuses. For example, in some embodiments, a first planar surface 205 may contain a touch screen display 118 and a second planar surface 207 may contain a display 118, actuators 120 used as input members, and input device 119, such as a track ball or an optical track pad. The planar surface visible from the closed position may be changed by flipping main portion 210, as shown in FIG. 6. First planar surface 205 and second planar surface 207 may also be accessed by physically separating main portion 210 from base portion 230. A physical separation may occur when the user lifts or slides main portion 210 away from base portion 230 so that the two portions are completely separate. For example, when physically separated, the user may hold base portion 230 in one hand and main portion 210 in the other.

Using magnetic force to keep main portion 210 and base portion 230 together has several advantages. First, physical connections between a base portion and a top portion add thickness to the portable electronic device because of the need to accommodate the mechanical connectors. Connection through magnetic attraction allows multiple sliding directions without adding to the thickness of the device. Magnetic attraction allows for multiple slide motions while removing the physical mechanisms required to accomplish a sliding motion, thus freeing up space for additional internal components or for reducing the physical size of the device. Further, magnetic attraction makes a flip motion of the main portion possible.

Figure 8A:
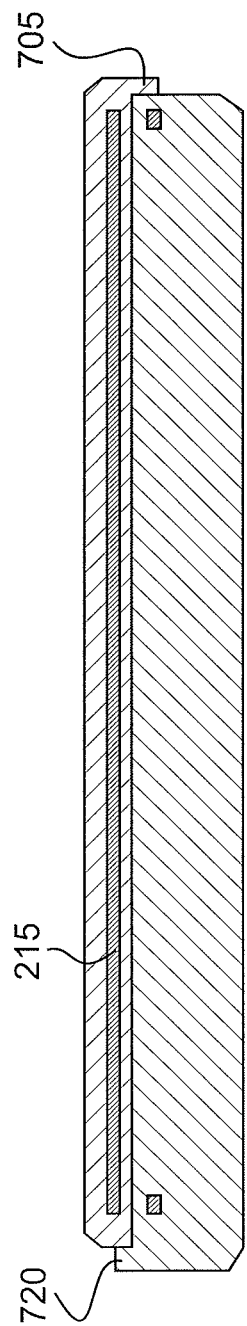
FIG. 8A is a section view taken along plane 8A-8A of FIGS. 7A and 7B, consistent with disclosed embodiments.
Figure 8B:
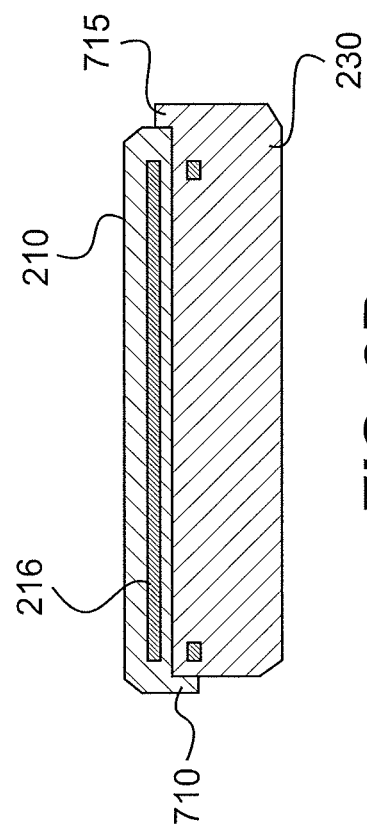
FIG. 8B is a section view taken along plane 8B-8B of FIGS. 7A and 7B, consistent with disclosed embodiments.

FIGS. 7-9 illustrate aspects of alternate embodiments of portable electronic device 100 that is capable of sliding main portion 210 in two separate directions with respect to base portion 230. FIG. 7A is a top view of main portion 210 and FIG. 7B is a top view of base portion 230 of portable electronic device 100 capable of sliding in two directions, consistent with disclosed embodiments. As can be seen in FIG. 7A, for example, main portion 210 may include magnetic areas 216 and 216' in addition to magnetic areas 215 and 215". Main portion 210 may also include main-portion guide rails 705 and 710 along perpendicular edges, as shown in FIG. 7A. Main-portion guide rails 705 and 710 may form a right angle. Base portion 230 may include guide rails 715 and 720 along perpendicular edges rather than parallel edges, as shown in FIG. 7B. Guide rails 715 and 720 may form a right angle, with the vertex of the right angle formed by guide rails 715 and 720 located diagonally from the vertex of the right angle formed by main-portion guide rails 705 and 710.

Figure 9B:
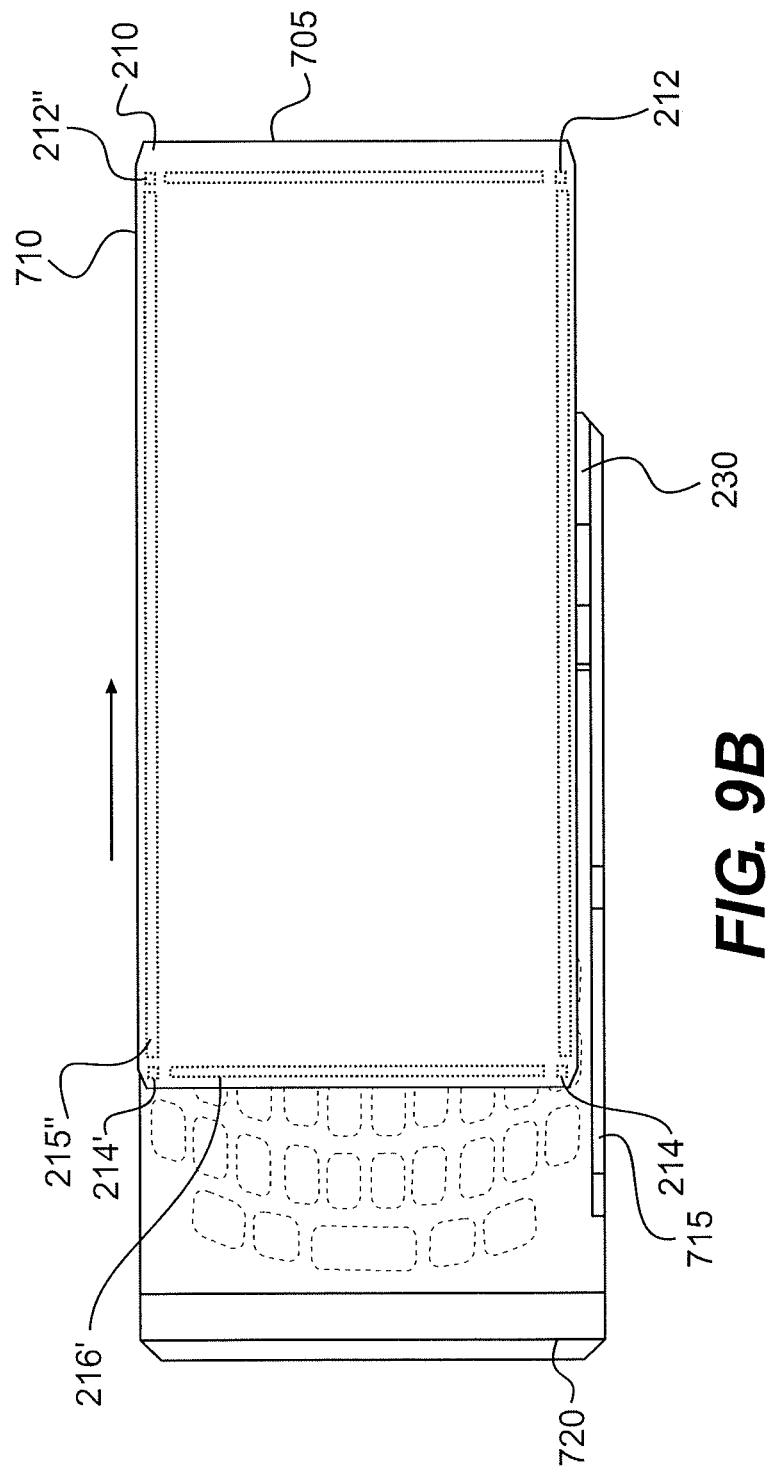
FIG. 9B is a topside view of a portable electronic device in a partially open position, consistent with disclosed embodiments.

Magnetic coupling between magnetic areas 216 and 216' and magnets 232" and 234' keep main portion 210 connected to base portion 230 when main portion 210 slides in the direction indicated in FIG. 9A. Guide rails 705 and 720 that run parallel to magnetic areas 216 and 216' may help define the direction of this sliding motion. Device 100, as shown in FIG. 9B, may also be capable of sliding in a direction parallel to magnetic areas 215 and 215". Guide rails 710 and 715 that run parallel to magnetic areas 215 and 215" may define the direction of this sliding motion.

Processor 102 may be configured to receive input from sensors located at magnets 232 and 234 to detect, for example, if magnet 232 is coupled with area 212, area 215, or not coupled at all. For example, processor 102 may cause output of one type of display when main portion 210 is closed, a different type of display when main portion 210 slides along magnetic area 215 and another type of display when main portion 210 slides along magnetic area 216. Alternatively, using the device shown in FIGS. 5A-5B, processor 102 may be configured to cause output of one type when magnet 232' and magnetic areas 214 or 215' achieve magnetic coupling and another type of output when magnet 234 and magnetic areas 214 or 215' achieve magnetic coupling.

The present disclosure may be embodied in other specific forms. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

Other embodiments of the disclosure will be apparent to those skilled in the art from consideration of the specification and practice of the disclosure disclosed herein. It is intended that the specification and examples be considered as exemplary only, with a true scope of the disclosure being indicated by the following claims.

What is claimed is:

1. A portable processing device, comprising: a base portion including guides and a magnet; and a main portion separable from the base portion, the main portion including a magnetic area, the base portion and the main portion being configured to be held together by a magnetic force between the magnetic area and the magnet, and the main portion being configured to be slideably movable with respect to the base portion in a sliding direction defined by the guides, wherein an end of the magnetic area defines an area of greater magnetic attraction than a remainder of the area, wherein the base portion further includes a cavity disposed adjacent to a top end of the base portion, and a second magnet disposed proximate the cavity, wherein a bottom of the main portion is pulled into the cavity by a magnetic force between the magnetic area and the second magnet when a sliding movement of the main portion brings the bottom of the main portion near the cavity, and wherein when the main portion is pulled into the cavity, the main portion sits at a set angle with respect to the base portion.

2. The device of claim 1, the main portion further comprising: a first planar surface including a first output apparatus; and a second planar surface including a second output apparatus, the first planar surface and the second planar surface being on opposite sides of the main portion, and the main portion being configured to be flipped with respect to the base portion, such that the main portion moves from a first position in which the first planar surface generally faces the base portion to a second position in which the second planar surface generally faces the base portion.

3. The device of claim 1, wherein the main portion is configured to operate as a portable processing device when separated from the base portion.

4. The device of claim 1, wherein the main portion further comprises an additional magnetic area of greater magnetic attraction than the magnetic area, the additional magnetic area being disposed at an end of the magnetic area.

5. The device of claim 1, wherein the guides include guide rails positioned parallel to each other along respective sides of the base portion.

6. The device of claim 1, wherein the guides include grooves positioned parallel to each other along respective sides of the base portion and wherein the top portion includes rails configured to fit removably into and slide within the grooves.

7. The device of claim 1, wherein the guides include ridges positioned parallel to each other along respective sides of the base portion and wherein the top portion includes grooves into which the ridges removably fit and within which the ridges slide.

8. The device of claim 1, wherein the guides include guide rails defining a right angle along two sides of the base portion and wherein the main portion includes main-portion guide rails defining a right angle along two sides of the main portion.

9. A method of operating a portable processing device, comprising: sliding a main portion with respect to a base portion in a direction defined by guides associated with the base portion; wherein the main portion is separable from the base portion and wherein the main portion is connectable with the base portion by a magnetic force between a magnet associated with the base portion and a magnetic area associated with the main portion, wherein an end of the magnetic area defines an area of greater magnetic attraction than a remainder of the area, and sliding a bottom of the main portion near a cavity disposed adjacent to a top end of the base portion; and pulling the bottom end of the main portion into the cavity by magnetic attraction between a second magnet disposed proximate the cavity and the magnetic area, wherein when the main portion is pulled into the cavity, the main portion sits at a set angle with respect to the base portion.

10. The method of claim 9, further comprising: flipping the main portion with respect to the base portion, such that the main portion moves from a first position in which a first planar surface of the main portion generally faces the base portion to a second position in which a second planar surface of the main portion generally faces the base portion.

11. The method of claim 9, further comprising:
separating the main portion from the base portion; and
operating the main portion as a portable processing device.

12. The method of claim 9, wherein the guides include guide rails positioned parallel to each other along respective sides of the base portion.

13. The method of claim 9, wherein the guides include grooves positioned parallel to each other along respective sides of the base portion and wherein the top portion includes rails configured to fit removably into and slide within the grooves.

14. The method of claim 9, wherein the guides include ridges positioned parallel to each other along respective sides of the base portion and wherein the top portion includes grooves into which the ridges removably fit and within which the ridges slide.

15. The method of claim 9, wherein the guides include guide rails defining a right angle along two sides of the base portion and wherein the main portion includes main-portion guide rails defining a right angle along two sides of the main portion.

16. The method of claim 15, further comprising sliding the main portion and the base portion in directions perpendicular to one another such that the main portion and the base portion are magnetically coupled to one another during at least portions of the sliding in the directions.

* * * * *

UNITED STATES PATENT AND TRADEMARK OFFICE
CERTIFICATE OF CORRECTION

| | | |
|---|---|---|
| PATENT NO. | : 8,503,174 B2 | |
| APPLICATION NO. | : 13/020955 | |
| DATED | : August 6, 2013 | |
| INVENTOR(S) | : Steven Henry Fyke | |

It is certified that error appears in the above-identified patent and that said Letters Patent is hereby corrected as shown below:

In the Specification

In column 6, line 2, "include planer planar surface" should read --include planar surface--.

Signed and Sealed this
Fifteenth Day of October, 2013

Teresa Stanek Rea
*Deputy Director of the United States Patent and Trademark Office*